US009341737B2

(12) United States Patent
Inanc et al.

(10) Patent No.: US 9,341,737 B2
(45) Date of Patent: May 17, 2016

(54) MEASURING TOTAL, EPITHERMAL AND THERMAL NEUTRON FORMATION POROSITIES WITH ONE SINGLE SET OF NEUTRON DETECTORS AND A PULSED NEUTRON GENERATOR (71) Applicants: Feyzi Inanc, Spring, TX (US); Margarete M. Kopal, Houston, TX (US); Loren Patrick Roberts, Humble, TX (US)

(72) Inventors: Feyzi Inanc, Spring, TX (US); Margarete M. Kopal, Houston, TX (US); Loren Patrick Roberts, Humble, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 52 days.

(21) Appl. No.: 14/177,768

(22) Filed: Feb. 11, 2014

(65) Prior Publication Data
US 2015/0226874 A1 Aug. 13, 2015

(51) Int. Cl.
*G01V 5/04* (2006.01)
*G01V 5/10* (2006.01)

(52) U.S. Cl.
CPC ...................................... *G01V 5/107* (2013.01)

(58) Field of Classification Search
CPC .......................................................... G01V 5/107
See application file for complete search history.

(56) References Cited

U.S. PATENT DOCUMENTS

| 3,509,346 | A | 4/1970 | Allen, Jr. |
| 3,529,160 | A | 9/1970 | Moran |
| 3,691,378 | A | 9/1972 | Hopkinson et al. |
| 4,122,340 | A | 10/1978 | Schultz |
| 4,384,205 | A | 5/1983 | Flaum |
| 4,604,522 | A * | 8/1986 | Arnold .......................... 250/264 |
| 4,760,252 | A | 7/1988 | Albats et al. |
| 4,910,397 | A | 3/1990 | Mills, Jr. et al. |
| 5,789,752 | A | 8/1998 | Mickael |
| 5,804,820 | A | 9/1998 | Evans et al. |
| 6,207,951 | B1 | 3/2001 | Yamauchi et al. |
| 7,334,465 | B2 | 2/2008 | Smits et al. |
| 2006/0226351 | A1* | 10/2006 | Stoller et al. ............... 250/269.1 |

(Continued)

FOREIGN PATENT DOCUMENTS

WO 2011133363 10/2011

OTHER PUBLICATIONS

Inanc, et al., "Physical basis, Modeling, and Interpretation of a New Gas Saturation Measurement for Cased Wells", SPWLA 50th Annual Logging Symposium, Jun. 21-24, 2009, 14 pages.

(Continued)

*Primary Examiner* — David Porta
*Assistant Examiner* — Edwin Gunberg
(74) *Attorney, Agent, or Firm* — Cantor Colburn LLP (57) ABSTRACT

An apparatus for estimating porosities of a formation includes: a borehole conveyable pulsed neutron generator to emit a pulse of high energy neutrons; a short spaced neutron detector to provide a count rate as a function of time; a long spaced neutron detector to provide a count rate as a function of time; a timing gate to synchronize a timing of neutrons detected by the detectors with respect to the neutron pulse; and a processor. The processor is configured to determine epithermal count rates and thermal count rates for the detectors based on timing of detection of neutrons with respect to the neutron pulse and calculate a first ratio of short to long spaced detector epithermal count rates and a second ratio of short to long spaced detector thermal count rates. The processor estimates an epithermal porosity using the first ratio and a thermal porosity using the second ratio.

24 Claims, 6 Drawing Sheets

(56) References Cited

U.S. PATENT DOCUMENTS

| | | |
|---|---|---|
| 2009/0045329 A1 | 2/2009 | Stoller et al. |
| 2011/0186723 A1 | 8/2011 | Chalitsios et al. |
| 2011/0224906 A1 | 9/2011 | Zhang et al. |
| 2011/0260044 A1* | 10/2011 | Wraight et al. ............ 250/252.1 |
| 2012/0197529 A1 | 8/2012 | Stephenson et al. |
| 2013/0206972 A1 | 8/2013 | Zhou et al. |

OTHER PUBLICATIONS

Oraby et al., "Investigation of an improved-sensititvity neutron-porosity oil-well logging tool", Nuclear Instruments and Methods in Physics Research A299 (1990), pp. 674-681.

* cited by examiner

MEASURING TOTAL, EPITHERMAL AND THERMAL NEUTRON FORMATION POROSITIES WITH ONE SINGLE SET OF NEUTRON DETECTORS AND A PULSED NEUTRON GENERATOR

BACKGROUND

Conventional earth formation porosity measurements are typically performed using chemical sources where there is a constant emission of neutrons with a specific energy spectrum. In such applications, formation porosity may be determined with a single set of neutron detectors that are sensitive to neutrons of only one type of energy—thermal or epithermal. Epithermal neutrons are typically detected using neutron detectors that are encapsulated inside high thermal capture cross section material. With that, the low energy tail of neutrons (i.e., predominantly the thermal neutrons) will be absorbed before they can reach active volume of the detectors. Accordingly, predominantly epithermal neutrons will be detected by these encapsulated detectors. Unfortunately, detection of epithermal and thermal neutrons for porosity measurements now requires two sets of detectors, one set shielded and one set unshielded, with the accompanying consequence of requiring premium space for the additional set of detectors in a space-limited downhole tool.

BRIEF SUMMARY

Disclosed is an apparatus for estimating an epithermal neutron porosity and a thermal neutron porosity of an earth formation. The apparatus includes: a carrier configured to be conveyed through a borehole penetrating an earth formation; a pulsed neutron generator (PNG) disposed on the carrier and configured to emit a pulse of high energy neutrons during a PNG-on time interval and to not emit neutrons during a PNG-off time interval that follows the PNG-on time interval; a short spaced neutron detector disposed on the carrier, spaced a first distance from the pulsed neutron generator, and configured to detect neutrons to provide a short spaced detector count rate as a function of time; a long spaced neutron detector disposed on the carrier, spaced a second distance from the pulsed neutron generator that is greater than the first distance, and configured to detect neutrons to provide a long spaced detector count rate as a function of time; a timing gate configured to synchronize a timing of neutrons detected by the short and long spaced detectors with respect to the pulse of high energy neutrons; and a processor. The processor is configured to: correct the short spaced detector count rate for a first time interval within the PNG-on time interval to provide a short spaced detector epithermal neutron count rate that decreases count rate due to thermal neutrons; correct the long spaced detector count rate that is with the first time interval to provide a long spaced detector epithermal neutron count rate that decreases count rate due to thermal neutrons; calculate a first ratio of short spaced detector epithermal neutron count rate to long spaced detector epithermal neutron count rate; calculate a second ratio of short spaced detector thermal neutron count rate to long spaced detector count rate for a second time interval that is within the PNG-off time interval; estimate the epithermal neutron porosity using the first ratio; and estimate the thermal neutron porosity using the second ratio.

Also disclosed is a method for estimating an epithermal neutron porosity and a thermal neutron porosity of an earth formation. The method includes: conveying a carrier through a borehole penetrating the earth formation; emitting a pulse of high energy neutrons using a pulsed neutron generator (PNG) disposed at the carrier during a PNG-on time interval that precedes a PNG-off time interval where the PNG does not emit high energy neutrons; synchronizing a timing of neutron detection with respect to the pulse of high energy neutrons using a timing gate; detecting neutrons from the formation as a function of time due to the pulse using a short spaced detector that is spaced a first distance from the pulsed neutron generator to provide a short spaced detector count rate as a function of time; detecting neutrons from the formation as a function of time due to the pulse using a long spaced detector that is spaced a second distance from the pulsed neutron generator that is greater than the first distance to provide a long spaced detector count rate as a function of time; correcting the short spaced detector count rate for a first time interval within the PNG-on time interval to provide a short spaced detector epithermal neutron count rate that decreases count rate due to thermal neutrons; correcting the long spaced detector count rate for the first time interval to provide a long spaced detector epithermal neutron count rate that decreases count rate due to thermal neutrons; calculating a first ratio of the short spaced detector epithermal count rate to the long spaced detector epithermal count rate; calculating a second ratio the short spaced detector count rate to the long spaced detector count rate for a second time interval that is within the PNG-off time interval; estimating the epithermal neutron porosity using the first ratio; and estimating the thermal neutron porosity using the second ratio; wherein correcting the short spaced detector count rate and the long detector count rate, calculating the first ratio and the second ratio, and estimating the epithermal neutron porosity and the thermal neutron porosity are implemented by using a processor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are apparatus and method for measuring the porosity of an earth formation using thermal and epithermal neutrons together to provide a total neutron porosity, epithermal neutrons by themselves by themselves to provide epithermal neutron formation porosity and only thermal neutrons to provide thermal neutron formation porosity. All measurements are performed with one set of neutron detectors that detect both epithermal neutrons and thermal neutron that result from a single pulse of neutrons that irradiate the formation. A timing gate synchronizes the timing of firing the neutron pulse with the timing of the detection of neutrons.

The detected neutrons are segregated into pulsed neutron generator "on" time neutrons composed of both epithermal and thermal neutron counts and neutron generator "off" time thermal neutron counts based on the timing. If "on" time neutron counts are used directly, it would lead to a total neutron formation porosity. If the thermal neutron counts are subtracted from the total "on" time neutron counts, then this would lead to epithermal neutron formation porosity. The thermal neutron counts during the "off" time lead to thermal neutron formation porosity. In addition to porosity other properties may be derived from the epithermal formation porosity and the thermal formation porosity.

Figure 1:
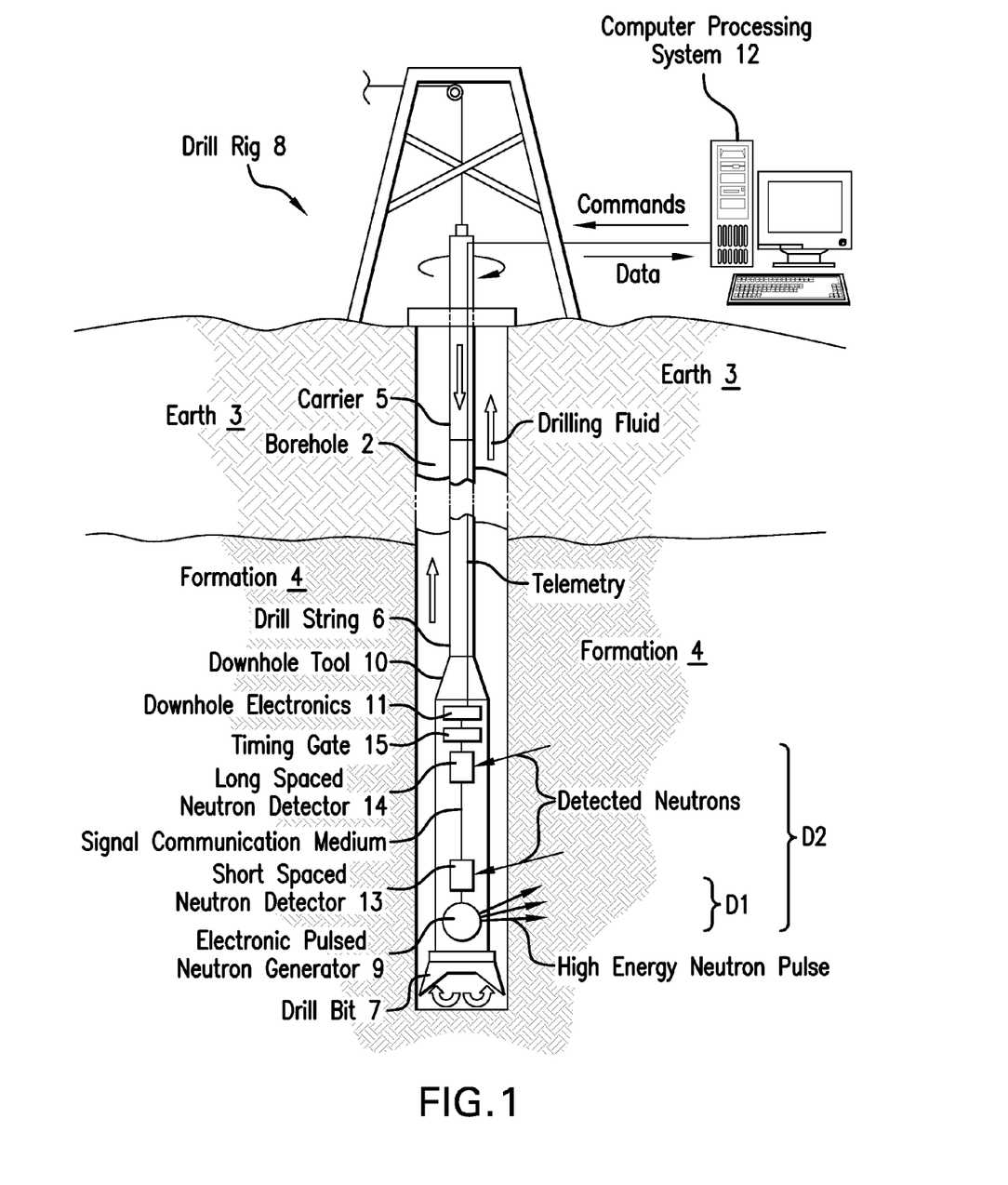
FIG. 1 illustrates a cross-sectional view of an exemplary embodiment of a downhole neutron porosity tool disposed in a borehole penetrating the earth.

Apparatus for measuring the porosities is now discussed with reference to FIG. 1. In FIG. 1, a cross-sectional view is illustrated of an exemplary embodiment of a downhole tool 10 disposed in a borehole 2 penetrating the earth 3, which may include an earth formation 4. The formation 4 represents any subsurface material of interest (including fluids) that may be sensed by the tool 10. The downhole tool 10 is conveyed through the borehole 2 by a carrier 5, which can be a drill tubular such as a drill string 6. A drill bit 7 is disposed at the distal end of the drill string 6. A drill rig 8 is configured to conduct drilling operations such as rotating the drill string 6 and thus the drill bit 7 in order to drill the borehole 2. In addition, the drill rig 8 is configured to pump drilling fluid through the drill string 6 in order to lubricate the drill bit 7 and flush cuttings from the borehole 2. Downhole electronics 11 are configured to operate the downhole tool 10, process measurement data obtained downhole, and/or act as an interface with telemetry to communicate data or commands between downhole components and a computer processing system 12 disposed at the surface of the earth 3. Non-limiting embodiments of the telemetry include pulsed-mud and wired drill pipe. System operation and data processing operations may be performed by the downhole electronics 11, the computer processing system 12, or a combination thereof. The downhole tool 10 may be operated continuously as the borehole is being drilled or at discrete selected depths in the borehole 2. In an alternative embodiment referred to as wireline logging, the carrier 5 may be an armored wireline, which can also provide communications with the processing system 12.

The downhole tool 10 includes an electronic pulsed neutron generator (PNG) 9 that is configured to emit a pulse of high energy (about 14 MeV) neutrons into the formation 4 during a time interval in which the PNG is "on." (When the PNG 9 is "off," the neutron pulse is terminated and high energy neutrons are no longer emitted.) The pulse may relate to a constant emission rate of neutrons while the PNG is on. The downhole tool 10 further includes a short spaced neutron detector 13 spaced a first distance D1 (e.g., about 15 inches) from the PNG 9 and a long spaced neutron detector 14 spaced a second distance D2 (e.g., about 22 inches) from the PNG 9 that is longer that the first distance D1 (i.e., D2>D1). Each of the neutron detectors 13 and 14 is configured to generate a count upon detection of a neutron. The count is represented by a signal that is received by the downhole electronics 11. In one or more embodiments, the neutron detectors contain a gas such as He-3 or Li-6 that undergoes a nuclear reaction upon interacting with an incoming neutron. The nuclear reaction may be a neutron-proton (n,p) reaction, for example, that emits a proton that is detected by creating a charge cloud in a stopping gas in the detector. With Li-6 glasses, a useful neutron reaction is a (n,α) reaction. The downhole tool 10 further includes an electronic timing gate 15. The timing gate 15 is configured to synchronize the timing of the discharge of the neutron pulse from the PNG 9 with the detection of neutrons by the neutron detectors 13 and 14. The synchronization enables the times of neutron detection with respect the time of the emission of the neutron pulse to be recorded. Hence, the term "synchronizing" relates to initiating the neutron pulse from the PNG and recording the start time when the PNG is "on" (i.e., beginning of pulse), the time when the PNG is "off" (i.e., end of pulse), time proceeding after the pulse emission ends, and neutron detection times as they relate to the PNG "on" and "off" times.

Figure 2:
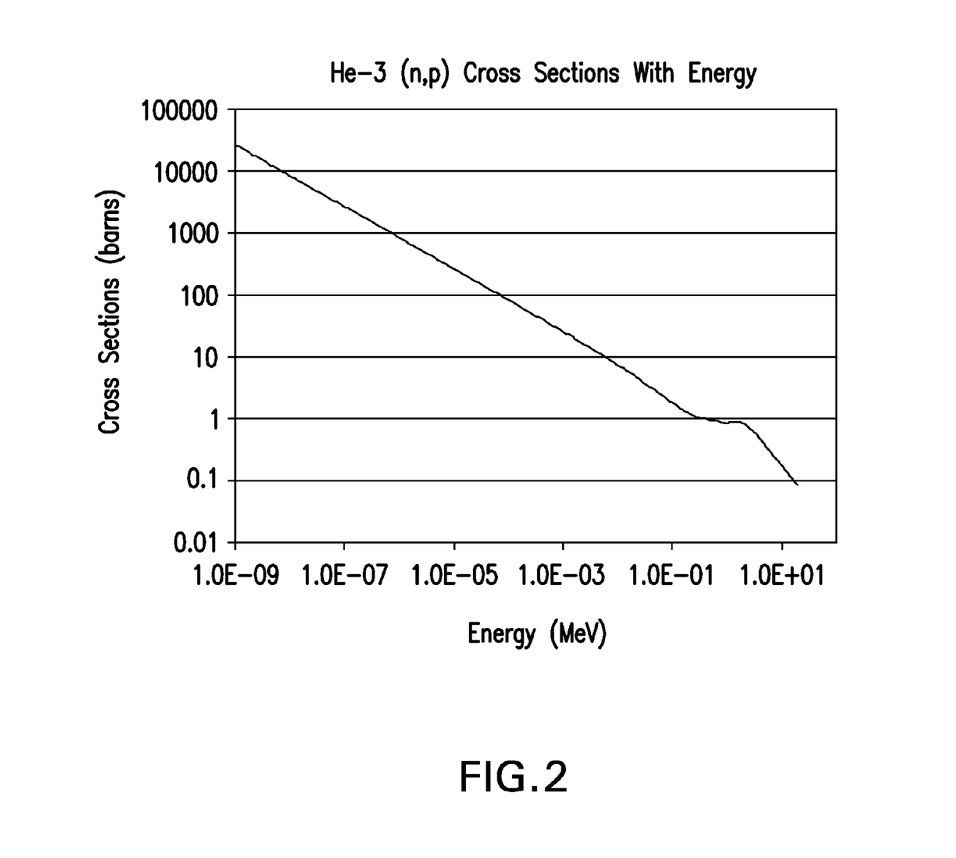
FIG. 2 is a graph of a cross-section for a (n,p) reaction with He-3 versus neutron energy.

The theory in support of the apparatus and method is now discussed. Deuterium-Tritium based pulsed neutron generators emit monochromatic 14 MeV neutrons. These neutrons slow down to thermal neutron energy levels (lower than about 0.6 eV and generally about 0.025 MeV) through elastic or inelastic scattering interactions. Usually, cross sections increase with the decreasing neutron energy. FIG. 2 illustrates this trend for (n,p) reactions for He-3. Since (n,p) cross sections increase with decreasing neutron energy levels, it is expected that there will be more (n,p) reactions at low energy levels for a given amount of neutrons.

The neutron interactions while the pulse is on differ from the neutron interactions when the pulse is turned off. When the pulse is on, there is a constant emission of 14 MeV neutrons. So the energy spectrum of the neutron flux during the pulse goes from 14 MeV neutrons to thermal neutrons. After the pulse is turned off, the neutron flux spectrum reaches an asymptotic spectrum where there are no longer faster neutrons available, but mostly if not all thermal neutrons. The shift in the energy spectrum of the neutron forms the basis of distinguishing between the neutron interactions during the pulse and after the pulse.

The neutrons can be detected by a detector only if the neutrons interact with the detector material. The detection rate is usually determined by the interaction cross section for a given energy and neutron flux for that energy level. The product of those two quantities gives the reaction rate and this provides the neutron detection count rates. Since the neutrons incident upon a detector will have a range of energies starting from about 14 MeV to the thermal neutron energy levels, total neutron count can be determined by integrating the reaction rates over this energy range. This is given by the following equation that has $\Sigma(E)$ as reaction cross section for energy E and $\phi(E)$ as neutron flux.

$$N = \int_0^{14MeV} \sum (E)\phi(E)dE$$

As stated previously, the cross section for (n,p) reactions happening at thermal energy levels in He-3 detectors is much higher compared to the fast neutron energy levels. During the pulse, this does not automatically imply that most of the (n,p) reactions are result of thermal neutron interactions. This stems from the fact that (1) at the beginning of each pulse, the neutron flux in the medium (i.e., formation) is very high and purely monochromatic around 14 MeV and there are no thermal neutrons (therefore, (n,p) reactions are going to be driven by fast neutrons) and (2) the rise of the thermal neutron flux is going to take place with a 2-10 microsecond time offset, for example, depending on the moderating power of the medium. The moderating power is usually a function of the hydrogen levels in the medium and inelastic scattering cross section levels. At the same time that the thermal neutron flux is building up during the emission of the neutron pulse, the PNG will still be emitting 14 MeV fast neutrons that drive fast neutron (n,p) reactions. Although cross sections at high energy levels may be very low, this can be counter balanced by high neutron flux levels due to continuous emission of 14 MeV neutrons. As a result, the counts recorded by a neutron detector (such as a He-3 based detector in this case) early on will be dominated by high energy neutron interactions although there will be some thermal neutron counts as well. At this point, recorded counts can be defined as total counts but it is possible to extract the thermal neutron counts and obtain count rates driven by epithermal (i.e., faster than thermal) neutrons only. Since high energy neutrons are less prone to capture cross sections, the epithermal neutron count rates recorded by the neutron detectors are going to reflect mainly the moderating power of the medium where the important factors are elastic scattering cross sections highly influenced by hydrogen levels in the medium and the inelastic scattering cross sections that are influenced by oxygen, carbon, silicon and others. The term "epithermal neutrons" relates to neutrons having energy greater than the energy of thermal neutrons. This concept is illustrated in FIG. 3.

Figure 3:
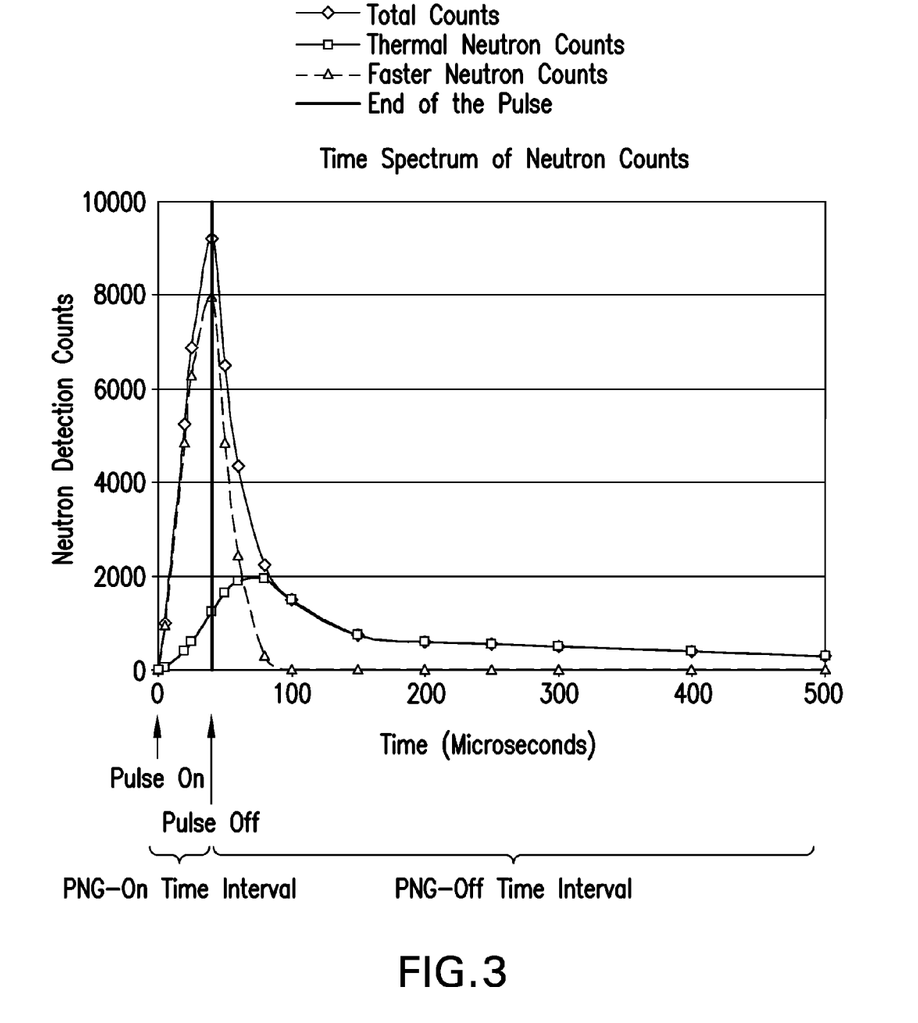
FIG. 3 is a graph of neutron detector counts versus time resulting from a neutron pulse.

In FIG. 3, a neutron pulse starts at time t=0. With that, an increase in the count rates is seen. After the neutron pulse is turned off, a sudden decrease in the count rates is seen and, at a later time, the count rates settle down to an asymptotic trend towards zero counts. The thermal neutron count rate starts to rise with a time offset from when the neutron pulse is turned off. The time offset is determined by the moderating power of the medium. If the count rates are integrated between time t=0 and time t=pulse off time, the integrated value would be predominantly determined by the faster neutrons. This would be true for both the short spaced detector and long spaced neutron detectors. Therefore, any porosity values determined using such pulse time count rates during the pulse on time interval will be determined by the faster neutrons.

If the same counting procedure were to be repeated for a time period that starts at around 80 microseconds, the results would be predominantly if not purely based on the thermal neutrons. Hence, any porosity values determined using such pulse time count rates during a time interval after the neutron pulse is off will be heavily influenced by the nuclides with high thermal-capture cross sections present in the formation.

Since two separate porosities are determined using this technique based on time gating, the technique provides a way of using the same set of detectors to measure both thermal and epithermal (faster neutron based) porosity values. Since epithermal porosity measurements are not influenced by the high thermal capture cross section nuclides, it would be more representative of the formation and the fluids in the formation. The thermal neutron porosity would present an indication of presence of high thermal capture cross section nuclides.

The epithermal neutron porosity and the thermal neutron porosity are estimated by taking the ratio R of the counting rate of the short spaced neutron detector to the counting rate of the long spaced detector for epithermal neutrons and thermal neutrons, respectively. As the amount of filled pore volume increases, it is expected that the counting rate of the long spaced (i.e., far) detector would decrease significantly while the short spaced (i.e., near) detector counting rate would decrease at a slower rate. Accordingly, the near to far counting-rate ratio R (near/far) will be expected to increase with porosity.

If fresh water filled the pores of a non-shale clean formation, then the epithermal neutron porosity and the thermal neutron porosity are expected to be the same. However, the presence of nuclides having a high thermal capture cross section in the medium, such as presence of shale and/or salt water for example, will affect the value of the thermal neutron porosity due to the increase in thermal neutron absorption. This will result in the epithermal neutron porosity being different from the thermal neutron porosity. In general, the presence of shale or salt water will cause the thermal neutron porosity to indicate a porosity value that is higher than the actual porosity of the formation. Since epithermal neutron porosity measurements are not influenced by the high capture cross section nuclides, it would be more representative of the formation and the fluids in the formation. The thermal neutron porosity would present an indication of presence of high capture cross section nuclides.

This difference in porosity values may be used to determine other properties of a formation of interest. For example, two separate measurements of porosity can be used to form cross plots to obtain information about the lithology, gas in the pore space, and/or salinity of the formation. If the formation is low porosity and shale free, the ratio $R_{EPITHERMAL}$ during PNG "on" time will be low, pointing out that the porosity is low. The same will be true for the PNG "off" time ratio $R_{THERMAL}$ as well. If the porosity is high and saturated with fluids such as either fresh water or oil, then the "on" time ratio $R_{EPITHERMAL}$ would be larger. The same would be true with the PNG "off" time ratio $R_{THERMAL}$ as well. The resulting epithermal and thermal porosity values would be comparable. If water in the formation is high salinity water, the "on" time ratio $R_{EPITHERMAL}$ would stay about the same, but the "off" time ratio $R_{THERMAL}$ would be quite large. In this phase, epithermal porosity would stay unchanged while thermal neutron porosity reading would be higher. Various combinations of "on" time and "off" time ratios and corresponding porosity values can point to various lithology and fluid combinations. For example, if both thermal and epithermal neutrons are calibrated to provide the same porosity values for a given lithology, for example limestone, they will diverge from each at certain directions and amounts when the tool is used in clean sandstone and dolomite formations. With that, the lithology in the system may be estimated. In one or more embodiments, the presence of gas in a formation may be detected when the downhole tool 10 is used in conjunction with a density tool (not shown) that measures formation density. The presence of gas will cause the density measurement values and the porosity measurement values to diverge in opposite directions. For clean gas saturated formations, both epithermal and thermal porosity values will underpredict (i.e., estimate low) the porosity with a given divergence from each other. If there is shale in the system in addition to gas, thermal neutron porosity values will diverge further enabling gas and shale combination predictions in the medium.

It can be appreciated that the downhole tool 10 can be calibrated or characterized by testing using a variety of formation materials having known properties in order to have the tool 10 provide accurate measurement values when used in the field with formations having properties to be determined. The testing can be in a laboratory setting where the tool 10 is tested by being surrounded by reference formation materials and/or in the field using actual formations having known property values. For example, in a laboratory environment, formation materials with different actual porosities may be filled with fresh water to provide various calibration points corresponding to the different porosities. Then, the fresh water may be replaced with salt water with different known salinities to provide further calibration points. Similarly, formation materials with various lithologies (e.g., sandstone, limestone, or dolomite) including shale may be tested. Formation materials filled with gas may be tested along with a density tool. The calibration points generally include $R_{EPITHERMAL}$ and $R_{THERMAL}$ for each test with known formation material properties. These calibration points may be assembled into an epithermal reference data set and a thermal reference data set such that actual epithermal neutron porosity measurements and thermal neutron porosity measurements may be correlated to the epithermal and thermal reference data sets, respectively, to provide accurate estimates of formation porosity and other formation properties. It can be appreciated that the testing may be limited to variations in expected formation properties and conditions of interest in order to efficiently obtain the reference data sets.

Some practical aspects of implementing the above disclosed techniques are now discussed. In general, when count rate data is collected, there are a series of bins that present time intervals. Data collected during time interval represented by a particular bin is "stored" in that bin. For example, each bin may represent 10 microseconds (μs) where the first bin goes from t=0 to t=10 μs. Usually, there are hundreds of these bins so that one time sweep will have a total time of T=(number of time bins)×(10 μs) with the pulse "on" time being represented by several bins. For calculating a ratio R, a time region is selected that generally includes more than one bin. For that time region, the counts in all the bins in the region are summed. Because there are two neutron detectors (i.e., short and long spaced), there is a series of bins for each of the detectors so that the total number of counts for each detector can be determined for each time region. The ratio R is then determined by the count rate of the short spaced detector (total number of counts in the time region by the short spaced detector divided by the total time of the region) divided by the count rate of the long spaced detector (total number of counts in the time region by the long spaced detector divided by the total time of the region). In one or more embodiments, the epithermal time region for calculating $R_{EPITHERMAL}$ is within the time interval when the PNG 9 is "on" emitting the neutron pulse and the thermal time region for calculating $R_{THERMAL}$ is within a time interval after the PNG 9 is "off" and has stopping emitting neutrons. In general, there may be an offset time interval separating the epithermal and thermal time regions. During the offset time interval, neither epithermal neutron interactions nor thermal neutron interactions predominate.

As can be seen in FIG. 3, when the pulsed neutron generator is on, the detectors will be detecting both high energy and thermal neutrons. Therefore, those counts can be defined as total counts. One way to extract fast neutron counts from the total counts is to estimate the profile over time of the thermal neutron detections (e.g., count rate). One way is to perform simulations of the downhole tool 10 to see how that thermal neutron detection profile varies with the time. The thermal neutron detection profile will start as soon as the pulsed neutron generator comes on and then it will extend into the time period where the pulsed neutron generator is off. If the simulated thermal neutron detection profile is normalized to the thermal neutrons detected in that second time frame where the PNG is off, the magnitude of the thermal neutron detections in the first time frame where the PNG is on can be determined based on the profile in the first time frame. Once that profile is predicted, it can be subtracted from the total counts or count rate in the first time frame to predict the high energy "epithermal" neutron counts or count rate. In doing so, two curves are obtained in the first time frame, total and epithermal. From those two curves, total and epithermal porosity can be determined. It can be appreciated that testing of the specific downhole tool 10 configuration may also be performed (in addition to or in lieu of simulation) in various lithologies of interest in order to estimate the thermal neutron detection profile in the first time frame.

Figure 4:
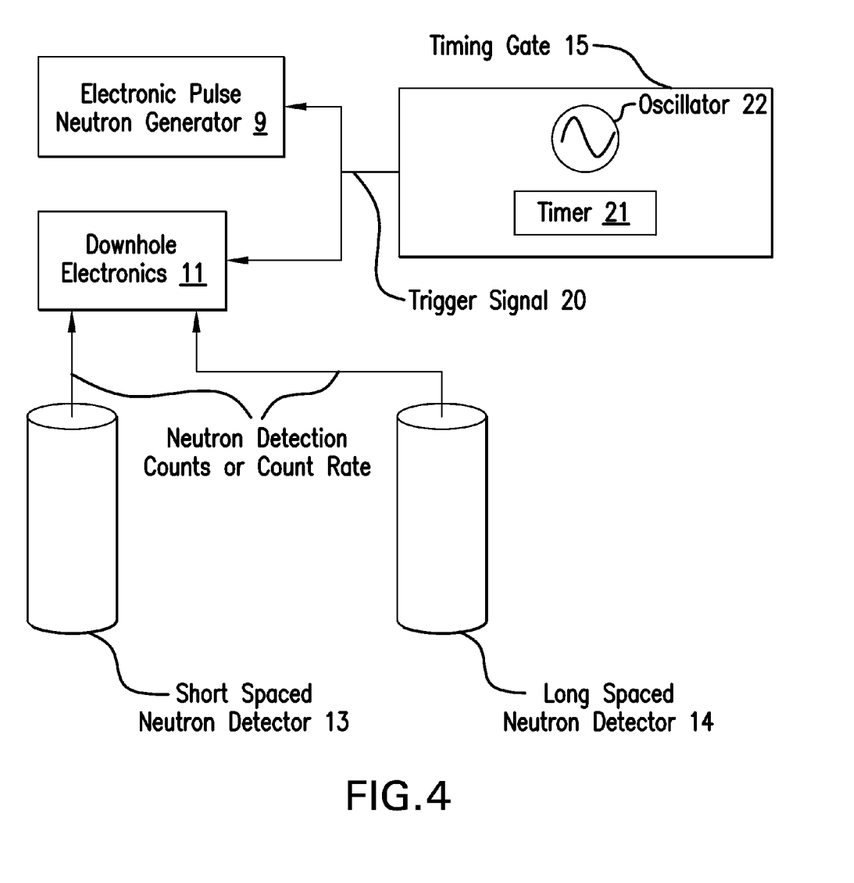
FIG. 4 depicts aspects of an electronic timing gate.

FIG. 4 depicts aspects of the electronic timing gate 15. The timing gate 15 and is configured to send a trigger signal 20 to (1) the PNG 9 to initiate the start of the neutron pulse and (2) the downhole electronics 11 to synchronize the timing of the reception of the neutron detection counts from the detectors 13 and 14 with the initiation of the neutron pulse. The timing gate 15 includes a timer 21 with the necessary precision to perform the synchronized timing functions. As discussed above, bins may be used to correlate the time of reception of the counts with the time intervals represented by the bins. The time duration of the neutron pulse is known and controlled by the electronics in the PNG 9. In one or more embodiments, the PNG 9 is fired at a frequency controlled by an oscillator 22 in the timing gate 15. Non-limiting embodiments of the frequency are 1 kHz and 10 kHz. A benefit of triggering the PNG 9 at a selected frequency is that the multiple measurements and associated timing sweeps provide for increased accuracy due to improved counting statistics. It can be appreciated that the timing gate may have other configurations that provide for synchronizing the detection times of epithermal neutron detection counts and thermal neutron detection counts with the start time of the neutron pulse. For example, the electronics of the PNG 9 may trigger itself at a known selected frequency and provide a timing signal to the timing gate 15, which synchronizes the detection count times to the receipt of the timing signal.

Figure 5A:
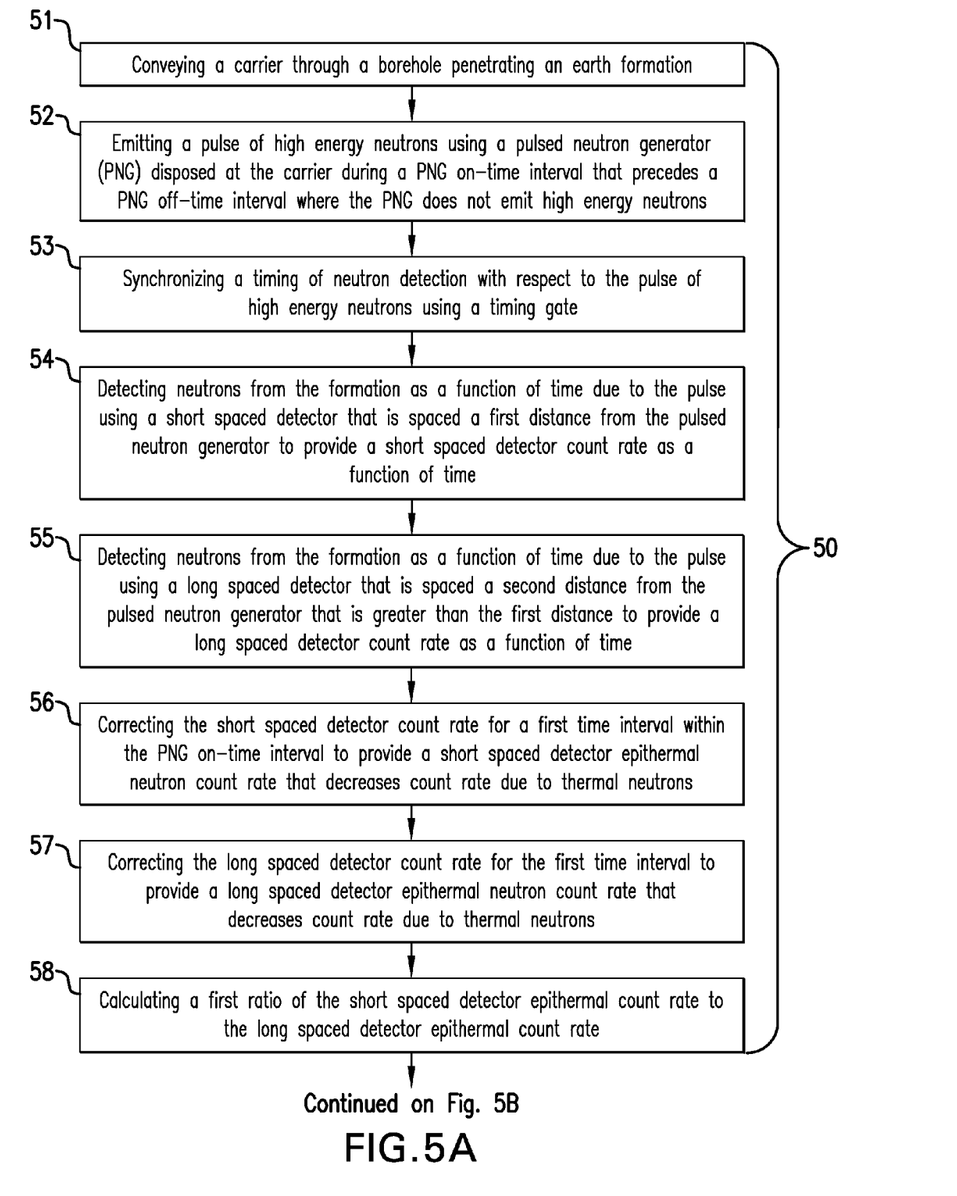
FIGS. 5A and 5B, collectively referred to as FIG. 5, illustrate a flow chart for a method for measuring a porosity of an earth formation.
Figure 5B:
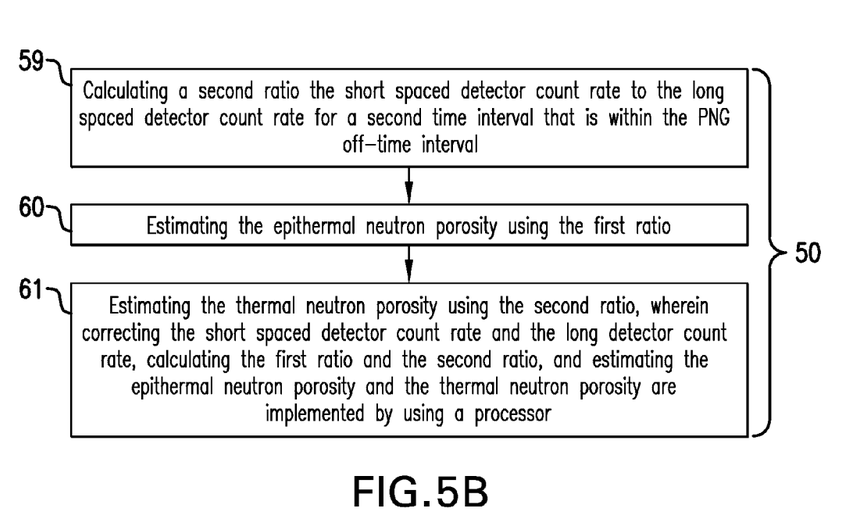

FIG. 5 is a flow chart for a method 50 for estimating an epithermal neutron porosity and a thermal neutron porosity of an earth formation. Block 51 calls for conveying a carrier through a borehole penetrating the earth formation. Block 52 calls for emitting a pulse of high energy neutrons using a pulsed neutron generator (PNG) disposed at the carrier during a PNG-on time interval that precedes a PNG-off time interval where the PNG does not emit high energy neutrons. Block 53 calls for synchronizing a timing of neutron detection with respect to the pulse of high energy neutrons using a timing gate. Block 54 calls for detecting neutrons from the formation as a function of time due to the pulse using a short spaced detector that is spaced a first distance from the pulsed neutron generator to provide a short spaced detector count rate as a function of time. Block 55 calls for detecting neutrons from the formation as a function of time due to the pulse using a long spaced detector that is spaced a second distance from the pulsed neutron generator that is greater than the first distance to provide a long spaced detector count rate as a function of time. Block 56 calls correcting the short spaced detector count rate for a first time interval within the PNG-on time interval to provide a short spaced detector epithermal neutron count rate that decreases count rate due to thermal neutrons. In one or more embodiments, the correcting of block 56 is implemented by subtracting an assumed shape or profile of a thermal neutron count rate for the short spaced detector from a total neutron count rate for the short spaced detector for the first time interval. The assumed shape or profile may be derived from simulation or testing of the downhole tool having the PNG and short and long spaced detectors in various formation materials/lithologies. Block 57 calls for correcting the long spaced detector count rate for the first time interval to provide a long spaced detector epithermal neutron count rate that decreases count rate due to thermal neutrons. In one or more embodiments, the correcting of block 57 is implemented by subtracting an assumed shape or profile of a thermal neutron count rate for the long spaced detector from a total neutron count rate for the long spaced detector for the first time interval. The assumed shape or profile may be derived from simulation or testing of the downhole tool having the PNG and short and long spaced detectors in various formation materials/lithologies. Block 58 calls for calculating a first ratio of the short spaced detector epithermal count rate to the long spaced detector epithermal count rate. Block 59 calls for calculating a second ratio the short spaced detector count rate to the long spaced detector count rate for a second time interval that is within the PNG-off time interval. In one or more embodiments, the second time interval may be separated from the first time interval by an offset or third time interval. In the third time interval, both epithermal neutron detection and thermal neutron detection may occur with neither predominating. Block 60 calls for estimating the epithermal neutron porosity using the first ratio. Estimating the epithermal neutron porosity may include correlating the first ratio to epithermal neutron reference data characterized to an apparatus that includes the PNG, the short spaced detector and the long spaced detector. Block 61 calls for estimating the thermal neutron porosity using the second ratio. Estimating the thermal neutron porosity may include correlating the second ratio to thermal neutron reference data characterized to the apparatus. The steps of blocks 56-61 may be implemented using one or more processors such that, for example, certain processors may perform certain steps and other processors may perform other steps.

The method 50 may also include calculating a third ratio of the short spaced detector count rate to the long spaced detector count rate for the first time interval and estimating a total neutron porosity using the third ratio. Estimating a total neutron porosity using the third ratio may include correlating the third ratio to total neutron reference data characterized to the apparatus. The method 50 may also include correlating a difference between the first ratio and the second ratio to formation property reference data characterized to the apparatus to estimate a property of the earth formation. Non-limiting examples of the property include an amount of salinity, an amount of a certain lithology such as shale for example, and an amount of gas. The method 50 may also include pulsing the pulsed neutron generator at a selected frequency using a timing gate.

The above disclosed techniques provide several advantages. One advantage is that the porosity and other formation properties may be estimated using a single set of neutron detectors that detect both epithermal neutrons and thermal neutrons although in different time intervals. By using a single set of detectors, duplicate or additional detectors are not required thereby conserving space in a downhole tool that may be used for other instruments. Availability of both epithermal and thermal neutron porosity logs would provide additional formation evaluation interpretation tools.

In support of the teachings herein, various analysis components may be used, including a digital and/or an analog system. For example, the downhole electronics 11, the computer processing system 12, the PNG 9, the detectors 13 and 14, or the timing gate 15 may include a digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a sequence or list of at least two terms is intended to mean any term or combination of terms. The terms "first," "second" and the like do not denote a particular order, but are used to distinguish different elements.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating an epithermal neutron porosity and a thermal neutron porosity of an earth formation, the apparatus comprising:
a carrier configured to be conveyed through a borehole penetrating an earth formation;
a pulsed neutron generator (PNG) disposed on the carrier and configured to emit a pulse of high energy neutrons during a PNG-on time interval and to not emit neutrons during a PNG-off time interval that follows the PNG-on time interval;
a short spaced neutron detector disposed on the carrier, spaced a first distance from the pulsed neutron generator, and configured to detect neutrons to provide a short spaced detector count rate as a function of time;
a long spaced neutron detector disposed on the carrier, spaced a second distance from the pulsed neutron generator that is greater than the first distance, and configured to detect neutrons to provide a long spaced detector count rate as a function of time;
a timing gate configured to synchronize a timing of neutrons detected by the short and long spaced detectors with respect to the pulse of high energy neutrons; and
a processor configured to:
correct the short spaced detector count rate for a first time interval within the PNG-on time interval to provide a short spaced detector epithermal neutron count rate that decreases count rate due to thermal neutrons;
correct the long spaced detector count rate that is with the first time interval to provide a long spaced detector epithermal neutron count rate that decreases count rate due to thermal neutrons;
calculate a first ratio of short spaced detector epithermal neutron count rate to long spaced detector epithermal neutron count rate;
calculate a second ratio of short spaced detector thermal neutron count rate to long spaced detector count rate for a second time interval that is within the PNG-off time interval;
estimate the epithermal neutron porosity using the first ratio; and
estimate the thermal neutron porosity using the second ratio.

2. The apparatus according to claim 1, wherein the processor is further configured to correlate the first ratio to epithermal neutron reference data characterized to the apparatus to estimate the epithermal neutron porosity and correlate the second ratio to thermal neutron reference data characterized to the apparatus to estimate the thermal neutron porosity.

3. The apparatus according to claim 1, further comprising calculating a third ratio of the short spaced detector count rate to the long spaced detector count rate for the first time interval and correlating the third ratio to total neutron reference data characterized to the apparatus to estimate the total neutron porosity.

4. The apparatus according to claim 1, wherein a third non-overlapping time interval is between the first time interval and the second time interval.

5. The apparatus according to claim 1, wherein the processor is further configured to correlate a difference between the first ratio and the second ratio to formation property reference data characterized to the apparatus to estimate a property of the earth formation.

6. The apparatus according to claim 5, wherein the property is an amount of salinity.

7. The apparatus according to claim 5, wherein the property is an amount of a lithology.

8. The apparatus according to claim 7, wherein the lithology is shale.

9. The apparatus according to claim 5, wherein the property is an amount of gas.

10. The apparatus according to claim 1, wherein the thermal neutrons have an energy less than 0.6 eV and the epithermal neutrons have an energy greater than the energy of the thermal neutrons.

11. The apparatus according to claim 1, wherein at least one of the short spaced detector and the long spaced detector comprise at least one of He-3 and Li-6 for interacting with a neutron to be detected.

12. The apparatus according to claim 1, wherein the timing gate is configured to trigger the pulsed neutron generator at a selected frequency.

13. The apparatus according to claim 1, wherein the carrier comprises at least one of a wireline, a slickline, a drill string, and coiled tubing.

14. A method for estimating an epithermal neutron porosity and a thermal neutron porosity of an earth formation, the method comprising:
conveying a carrier through a borehole penetrating the earth formation;
emitting a pulse of high energy neutrons using a pulsed neutron generator (PNG) disposed at the carrier during a PNG-on time interval that precedes a PNG-off time interval where the PNG does not emit high energy neutrons;
synchronizing a timing of neutron detection with respect to the pulse of high energy neutrons using a timing gate;
detecting neutrons from the formation as a function of time due to the pulse using a short spaced detector that is spaced a first distance from the pulsed neutron generator to provide a short spaced detector count rate as a function of time;
detecting neutrons from the formation as a function of time due to the pulse using a long spaced detector that is spaced a second distance from the pulsed neutron generator that is greater than the first distance to provide a long spaced detector count rate as a function of time;
correcting the short spaced detector count rate for a first time interval within the PNG-on time interval to provide a short spaced detector epithermal neutron count rate that decreases count rate due to thermal neutrons;
correcting the long spaced detector count rate for the first time interval to provide a long spaced detector epithermal neutron count rate that decreases count rate due to thermal neutrons;
calculating a first ratio of the short spaced detector epithermal count rate to the long spaced detector epithermal count rate;
calculating a second ratio the short spaced detector count rate to the long spaced detector count rate for a second time interval that is within the PNG-off time interval;
estimating the epithermal neutron porosity using the first ratio; and
estimating the thermal neutron porosity using the second ratio;
wherein correcting the short spaced detector count rate and the long detector count rate, calculating the first ratio and the second ratio, and estimating the epithermal neutron porosity and the thermal neutron porosity are implemented by using a processor.

15. The method according to claim 14, wherein estimating the epithermal neutron porosity comprises correlating the first ratio to epithermal neutron reference data characterized to an apparatus comprising the PNG, the short spaced detector and the long spaced detector and estimating the thermal neutron porosity comprises correlating the second ratio to thermal neutron reference data characterized to the apparatus.

16. The method according to claim 14, further comprising calculating a third ratio of the short spaced detector count rate to the long spaced detector count rate for the first time interval and estimating a total neutron porosity using the third ratio.

17. The method according to claim 16, wherein estimating the total neutron porosity comprises correlating the third ratio to total neutron reference data characterized to the apparatus to estimate the total neutron porosity.

18. The method according to claim 14, further comprising correlating a difference between the first ratio and the second ratio to formation property reference data characterized to the apparatus to estimate a property of the earth formation.

19. The method according to claim 18, wherein the property is an amount of salinity.

20. The method according to claim 18, wherein the property is an amount of a lithology.

21. The method according to claim 18, wherein the lithology is shale.

22. The method according to claim 18, wherein the property is an amount of gas.

23. The method according to claim 14, wherein a third time interval is between the first time interval and the second time interval, the third interval corresponding to detecting both epithermal and thermal neutrons by the short spaced and long spaced detectors.

24. The method according to claim 14, further comprising pulsing the pulsed neutron generator at a selected frequency using a timing gate.

* * * * *